2,865,681

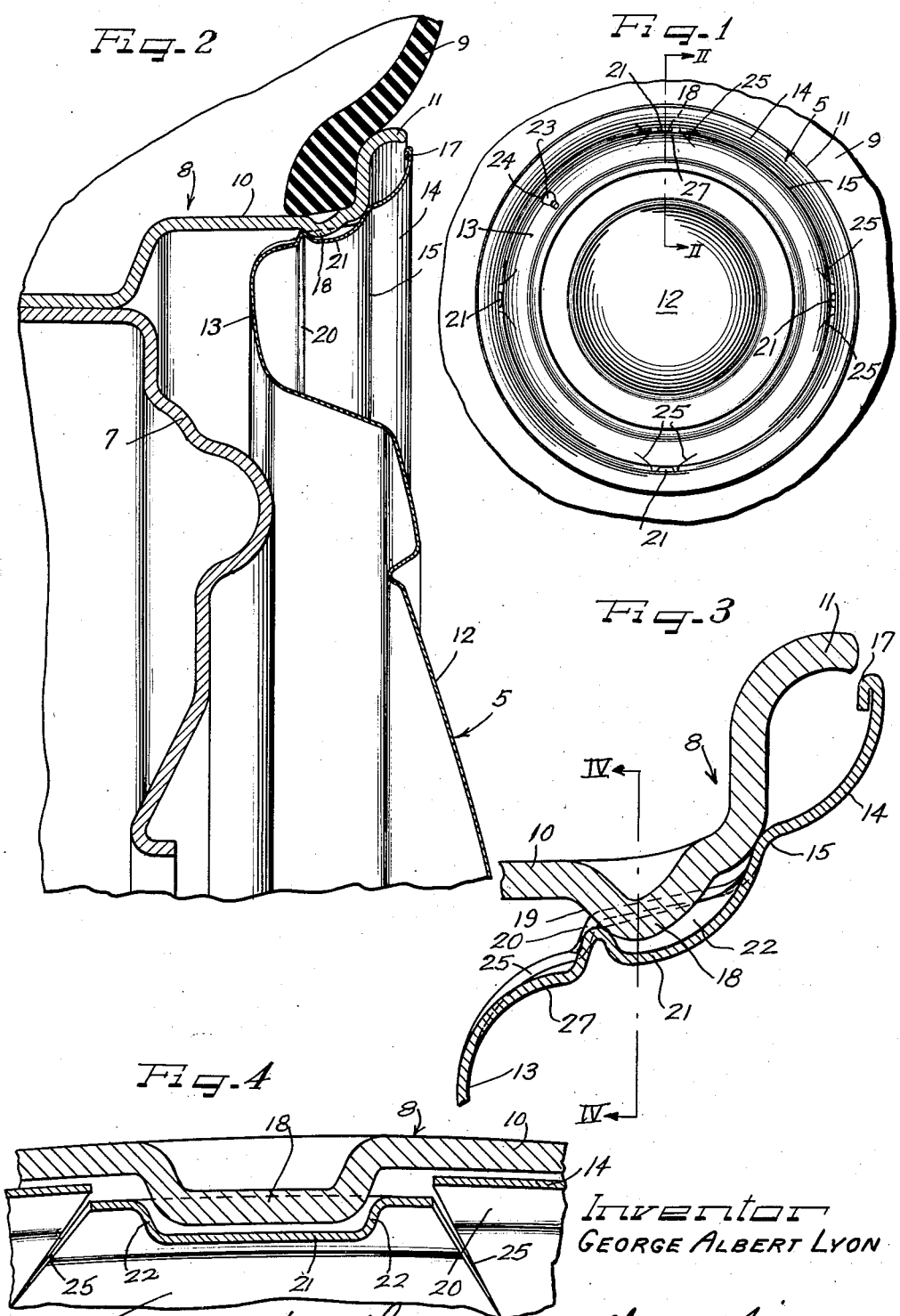

WHEEL COVER

George Albert Lyon, Detroit, Mich.

Application April 24, 1956, Serial No. 580,404

6 Claims. (Cl. 301—37)

The present invention relates to improvements in wheel structures and more particularly concerns the ornamental and protective covering of the outer sides of vehicle wheels.

An important object of the present invention is to provide an improved wheel structure having novel cover means on the outer side thereof provided with improved retaining structure.

Another object of the invention is to provide in a cover for disposition at the outer side of a vehicle wheel improved cover retaining means.

A further object of the invention is to provide in a wheel structure an improved snap-on pry-off retaining arrangement for maintaining a cover on the outer side of the wheel.

Yet another object of the invention is to provide an improved inexpensive sheet metal stamping type of cover for disposition at the outer side of a vehicle wheel having novel resilient cover retaining means engageable with retaining bumps on a wheel member.

Other objects, features and advantages of the present invention will be readily apparent from the following detailed description of a preferred embodiment of the invention taken in conjunction with the accompanying drawing in which:

Figure 1 is an outer side elevational view of a wheel structure embodying features of the invention;

Figure 2 is an enlarged fragmentary radial sectional detail view taken substantially on the line II—II of Figure 1;

Figure 3 is a substantial fragmentary enlargement of the wheel tire rim and the engaging portion of the cover showing in detail the cover retaining means; and Figure 4 is a fragmentary sectional detail view taken substantially on the line IV—IV of Figure 3.

A cover 5 embodying features of the invention is adapted to be applied in snap-on pry-off relation to the outer side of a vehicle wheel which may comprise a disk spider wheel body 7 carrying a tire rim 8 of the multi-flange type adapted to support a pneumatic tire 9. The tire rim 8 has an intermediate generally axially extending and radially outwardly sloping flange 10 which merges with a terminal flange 11.

In the present instance the cover 5 comprises a full disk cover, that is a cover that is adapted to substantially completely cover the outer side of the wheel including the tire rim and the wheel body and is made out of a single piece of material. However it should be noted that if desired the cover could comprise a trim ring that would cooperate with a central hub cap on the wheel.

In the present instance the cover 5 includes a central crown portion 12 for overlying the wheel body and joining on an annular indented dished portion 13 a radially outwardly and axially outwardly sloping marginal flange portion 14 which is adapted to overlie the tire rim and more particularly the intermediate flange 10 and the terminal flange 11. In the present instance in order to define the axially inward disposition of the cover on the wheel, the radially outer marginal portion has an indented annular reinforcing and seat rib 15 radially inwardly from the outer turned edge 17 thereof for seating on the terminal flange 11 adjacent juncture thereof with the intermediate flange 10.

According to the present invention, the cover 5 is provided with retaining means engageable in snap-on, pry-off relation with cover retaining bumps 18 which may be four in number equidistantly circumferentially spaced on the axially outer portion of the intermediate flange 10 and projecting generally radially inwardly with generally radially and axially inwardly facing undercut sloping retaining shoulders 19 on the bumps. To this end, the cover is provided with bump engaging shoulder means comprising an annular turned, offset generally radially and axially outwardly sloping shoulder 20 formed on the radially inner portion of the marginal cover portion 17 adjacent juncture thereof with the indented intermediate portion 13 of the cover. The spacing of the shoulder 20 from the seat rib 15 is such that when the seat rib 15 engages the tire rim, the shoulder 20 will be disposed in cover retaining relation to the retaining bump shoulders 19.

In order to accommodate the radially inwardly projecting nose portion of the retaining bumps 18, the cover is provided at the axially outer side of the cover retaining shoulder 20 with radially inwardly pressed bump receiving pockets 21. These pockets are defined at circumferentially opposite sides thereof by respective shoulder walls 22 which are adapted in assembly with the wheel to oppose the opposite sides of the respective retaining bumps 18 for thereby holding the cover against turning on the wheel and thereby avoiding distortion of a valve stem 23 which projects through a suitable valve stem aperture 24 in the intermediate cover portion 13.

In order to improve the resilient yieldability of those portions of the shoulder 20 that are directly retainingly engageable with the retaining bumps 18, such portions are preferably severed from the remaining intermediate portions of the shoulder 20. In a preferred form this is effected by slitting the cover across the shoulder 20 at each side of each of the pockets 21. Herein this is effected by respective slits 25 which are preferably generally convergently related toward the reinforcing rib 15 and extend at their axially outer ends from adjacent to such seat and reinforcing rib 15 to divergent axially inner ends that extend into the intermediate cover portion 13. This affords generally axially extending relatively flexibly resilient cover retaining portions 27 containing the bump receiving pockets 21 and bump engaging respective transversely extending portions of the shoulder 20. By preference the diameter described about the shoulder 20 is slightly less than the diameter of the axially outer portion of the intermediate flange 10, but greater than the diameter about the tips of the retaining bumps 18. Therefore, when the cover is pressed axially inwardly into retaining engagement with the wheel, and more particularly to snap the shoulder portions on the flexible pocket carrying resilient strips 27 over the retaining bumps 18, the shoulder portions 20 on the strips 27 will engage under camming axially inwardly drawn tension with the retaining bump shoulders 19. Thereby firm gripping of the retaining bumps 18 is assured and also firm drawing of the seating shoulder rib 15 against the tire rim is assured.

For removing the cover from the wheel, a suitable pry-off tool such as a screwdriver is inserted into the gap between the turned extremity flange 17 of the cover and the terminal flange 11 and pry-off force applied to resiliently snap the retaining shoulder portions 20 of the flexibly resilient strips 27 out of engagement from the retaining bumps 18. It may be noted that if additional pry-off force is needed, the pry-off tool can be inserted behind the reinforcing and seating shoulder 15 which may serve as an additional pry-off shoulder.

It will be understood that modifications and variations may be effected without departing from the scope of the novel concepts of the present invention.

I claim as my invention:

1. In a wheel structure including a wheel part having retaining bumps projecting therefrom, a cover for disposition at the outer side of the wheel including a circular normally substantially stiff portion for opposing said bumps and having shoulder means thereon for retainingly engaging in snap-on pry-off relation with the bumps, the cover portion at opposite sides of the shoulder means having resilient deflectability enhancing separations, said separations defining generally axially extending strips having said shoulder means and connected integrally with the cover at their opposite ends but free at their sides so as to be relatively resiliently flexible relative to the adjacent portions of the cover.

2. In a wheel structure including a tire rim having retaining bumps on a radially inwardly facing flange thereof, a cover for disposition at the outer side of the wheel including a circular portion thereof for opposition to said bumps and having respective bump receiving pockets defined at their axially inner side by shoulders engageable with the retaining bumps, said pockets being on resiliently deflectable portions of said circular cover portion partially separated therefrom to enhance the deflectability thereof, said partially separated portions comprising strap-like sections connected to the cover at their axially inner and outer ends and separated at the sides, with said sides flaringly related so that the widest and thereby stiffest portions thereof are at the axially inner part thereof.

3. In a cover for disposition at the outer side of a vehicle wheel, a cover body having a generally axially extending annular portion for disposition opposite a wheel part having retaining bumps, said cover portion having retaining shoulder structure thereon, said retaining shoulder structure being separated along generally axially extending lines from the remainder of said cover portion but connected at axially inner and outer ends with the cover so as to be of enhanced resilient deflectability relative to the remainder of the cover, said separated portions including bump receiving pockets defined at their axially inner sides by bump engaging shoulders.

4. In a cover for disposition at the outer side of a vehicle wheel, a circular cover member having a circular normally stiff and generally axially extending portion, said portion having a plurality of circumferentially spaced strips extending generally axially and connected integrally in one piece with said portion at the axially inner and outer ends of the strips but separated from the remainder of the portion along the circumferential side edges of the strips, each of said strips having therein a socket defined at its axially inner side by a generally axially outwardly facing shoulder for snap-on, pry-off interengagement with a retaining projection on a wheel, with the strip being resiliently radially deflectable for snapping into or out of engagement with the retaining projection.

5. In a wheel structure including a tire rim having generally radially inwardly projecting cover retaining projections provided with generally axially and radially inwardly facing cover retaining shoulders, a cover for disposition at the outer side of the wheel including a generally axially extending portion of a diameter larger than said retaining projections and said cover portion being of a normal substantial stiffness, said portion having areas thereof opposing said projections connected integrally with the cover at axially inner and outer ends and separated from said cover portion along generally axially extending lines to provide resilient strap-like portions that are resiliently radially deflectable, each of said strap-like portions having a cover retaining shoulder thereon engageable under resilient tension with the retaining shoulder of the opposing projection, and the cover having a portion thereof engageable with the wheel to define the axially inward disposition thereof for thereby retaining said strap-like portion shoulders under tensioned engagement with the projection shoulders and deflected radially inwardly relative to the remainder of the circular cover portion.

6. In a wheel structure including a tire rim having generally radially inwardly projecting cover retaining projections provided with generally axially and radially inwardly facing cover retaining shoulders, a cover for disposition at the outer side of the wheel including a generally axially extending portion of a diameter larger than said retaining projections and said cover portion being of a normal substantial stiffness, said portions having areas thereof opposing said projections connected integrally with the cover at axially inner and outer ends and separated from said cover portion along generally axially extending lines to provide resilient strap-like portions that are resiliently radially deflectable, each of said strap-like portions having a cover retaining shoulder thereon engageable under resilient tension with the retaining shoulder of the opposing projection, and the cover having a portion thereof engageable with the wheel to define the axially inward disposition thereof for thereby retaining said strap-like portion shoulders under tensioned engagement with the projection shoulders and deflected radially inwardly relative to the remainder of the circular cover portion, each of said strap-like portions having axially outwardly from the shoulder thereof a pocket embossed radially inwardly and receptive of the engaged projection and coacting therewith to retain the cover against turning on the wheel.

References Cited in the file of this patent

UNITED STATES PATENTS

| | | |
|---|---|---|
| 2,308,617 | Lyon | Jan. 19, 1943 |
| 2,624,640 | Lyon | Jan. 6, 1953 |
| 2,669,487 | Horn | Feb. 16, 1954 |